Patented Jan. 12, 1926.

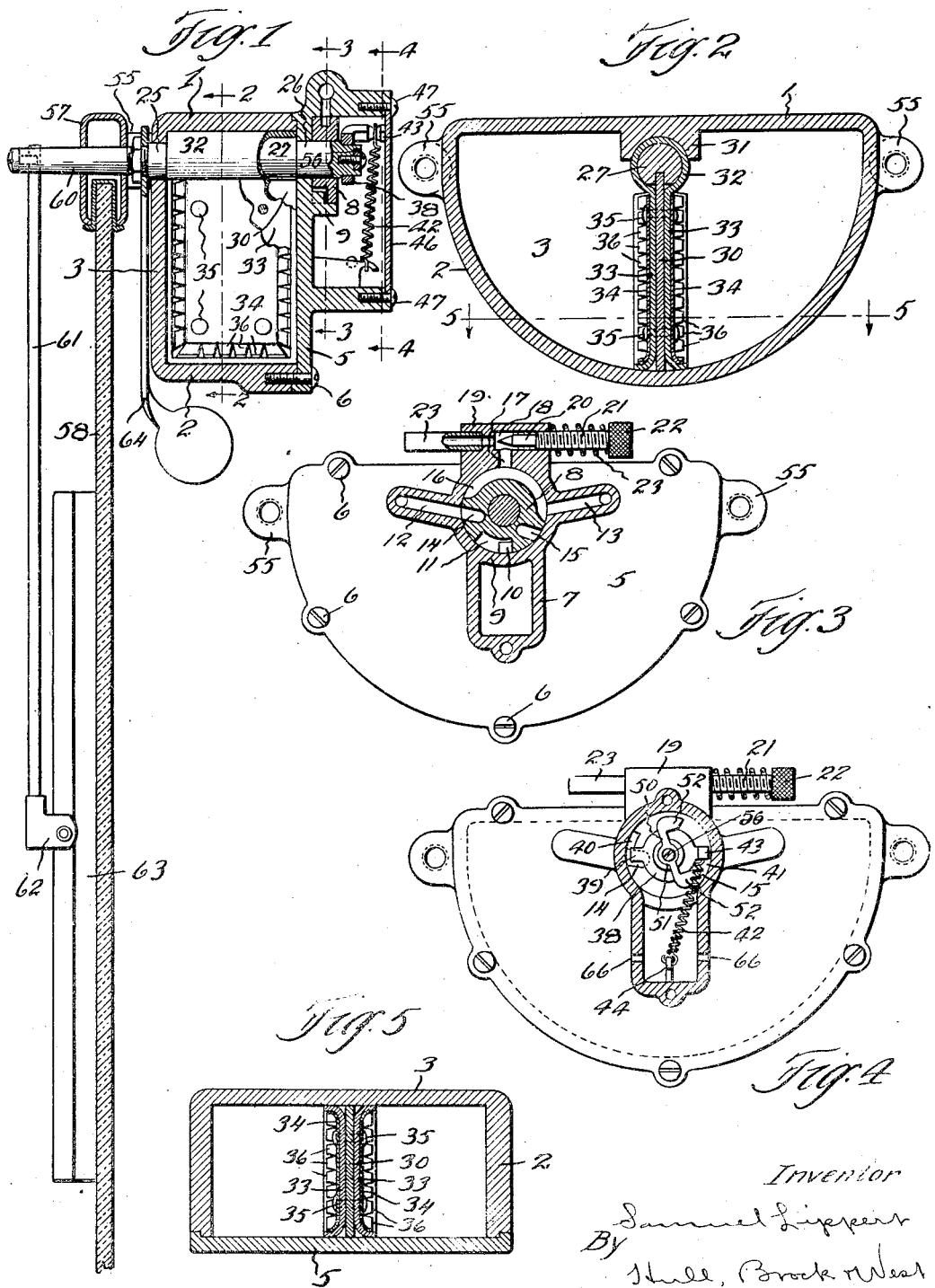

1,569,429

UNITED STATES PATENT OFFICE.

SAMUEL LIPPERT, OF GARFIELD HEIGHTS, OHIO, ASSIGNOR TO THE OUTLOOK COMPANY, OF CLEVELAND, OHIO, A CORPORATION OF OHIO.

ROTARY ENGINE.

Application filed May 14, 1923. Serial No. 638,835.

*To all whom it may concern:*

Be it known that I, SAMUEL LIPPERT, a citizen of the United States, residing at Garfield Heights, in the county of Cuyahoga and State of Ohio, have invented a certain new and useful Improvement in Rotary Engines, of which the following is a full, clear, and exact description, reference being had to the accompanying drawings.

This invention relates to improvements in motors of the type wherein a vane or piston fixed to a shaft oscillates within a casing that is generally of segmental shape, and it has to do more particularly with an improved packing for the shafts and pistons of motors of this character.

Considerable difficulty has been experienced in obtaining a fluid tight joint between the piston shaft and the adjacent casing wall and about the shaft bearings without the construction being of such nature as to require very accurate work, and the consumption of much time in assembling it, thus making the production cost of the motor excessively high. Furthermore, the constructions heretofore employed have proven more or less inefficient and lacking in durability, permitting leakage between the chambers separated by the piston, and more particularly adjacent the bearings of the piston shaft.

It is the aim of my invention to provide a simple and inexpensive packing for pistons of motors of the character above referred to and which may be very conveniently and quickly assembled and placed within the motor casing with the assurance that the joints between the piston, piston shaft and casing walls will be fluid tight and will remain so indefinitely.

The results set forth are attained in the construction illustrated in the accompanying drawing where the motor is shown for operating an automobile windshield cleaner.

Fig. 1 is a vertical section through a windshield equipped with a wiper that is driven by the motor incorporating my improvements, the motor being shown in central vertical section; Fig. 2 is a transverse vertical section through the motor, as indicated by the line 2—2 of Fig. 1; Figs. 3 and 4 show the motor casing in rear elevation and the valve and valve actuating mechanism as they would appear in sections taken on the respective lines 3—3 and 4—4 of Fig. 1; and Fig. 5 is a horizontal section on the line 5—5 of Fig. 2.

The motor casing is comprised of a shell that is generally of segmental shape having a flat top wall 1, a curved wall 2 and a segmental wall 3. The rear side of the shell is open and is adapted to be closed by a cover plate 5 which conforms in outline to the wall of the shell and which joins the wall of the shell in such manner as to form a fluid tight joint when drawn firmly thereagainst by screws 6. After assembly, the joint may be filled with suitable material, such as solder, for insuring it against leakage. Formed integral with the closure 5 is a valve chest 7 which houses a cylindrical valve body 8 that is contained within a hollow boss 9. The valve body is adapted to be oscillated within the boss by means presently to be described and it is limited in its movements by a fixed lug 10 that projects into a notch 11 of the valve body. Extending laterally in opposite directions from the boss 9, through ribs that are formed integral with the closure 5, are passageways 12 and 13 which lead to the opposite ends of the casing; and ports 14 and 15 of the valve body are adapted to be brought into register with the respective passageways 12 and 13 when the valve body is oscillated, and as will be seen by reference to Fig. 4, the ports 14 and 15 open through the rear face of the valve body. A groove 16 extends circumferentially about the top of the valve body and is of such length that its opposite ends overlap one or the other of the passageways 12 or 13 according to the angular position of the valve body. The groove 16 is also in communication with a passageway 17 which opens at its outer end into a bore 18 of a boss 19 which rises from the top of the valve chest 7. The bore 18 is reduced in diameter in one direction from the passageway 17 to form a seat for a needle valve 20, the threads of the stem whereof screw into the threaded portion of the bore 18 that is in the opposite direction from said passageway 17. The valve stem is provided with a suitable operating head 22, and a spring 23 is interposed between the head and the opposed end of the boss 19 for the purpose of producing sufficient friction between the threads of the valve stem and those of the bore to maintain the valve against accidental disturbance. A nipple 23 is secured in the opposite end of the bore 18 to provide a suitable conduit or hose connection. The wall 3 of the casing, and the closure 5, have axially aligned bearing apertures within which the respective bearing portions 25 and 26 of the piston shaft 27 are journaled, the bearing portion 26 extending through a central opening in the valve body 8 and being slightly reduced in diameter therebeyond for a purpose presently to be explained.

The piston, designated 30, is in the form of a plate which has its inner edge contained within a groove of a shaft 27 and is of a size to easily operate within the casing without friction against the walls thereof. An enlargement 31 is formed on the top wall 1 of the casing and its underside is grooved, the surface of said groove being spaced a suitable distance from, and concentric with, the shaft 27. The piston packing whereof my invention consists, is formed of a continuous piece of suitable flexible material, such as leather, and its central portion 32 is wrapped about the shaft 27, and its end portions 33 are brought down along the opposite sides of the piston 30 and are clamped thereto by spreaders 34. The spreaders and piston are connected together by rivets 35, or their equivalents. The portions 33 of the packing are of greater area than the piston so that their edge portions flare outwardly and wipe upon the walls of the casing, said edge portions being frictionally held in contact with said walls by the peripheral spring tongues 36 of the spreaders 34, said spreaders being formed of suitable resilient material, such as light spring steel or spring brass. The spacing of the curved surface of the enlargement 31 from the shaft 27 is sufficiently less than the normal thickness of the packing material to cause said material to be slightly compressed between the opposed surfaces of said parts, and the ends of the portion 32 of the packing material bear against the walls of the casing about the ends of the shaft and thus prevent leakage through the apertures wherein the bearing portions of the shaft are journaled.

Loosely mounted upon the reduced end of the piston shaft, where it protrudes beyond the valve body 8, is the hub portion 38 or what may be termed a tappet 39 which is arranged to engage lugs 40 and 41 that extend rearwardly from the valve body 8 at substantially diametrically opposite points. The tappet 39 is thrown to the full limit of its movement in opposite directions by a spring 42 that has one of its ends connected to a rearwardly extending arm 43 of the tappet, and its opposite end anchored to a hook 44 which is located in the lower part of the valve chest and in substantially vertical alignment with the axis of the tappet. The arm 43 extends far enough rearwardly to bear against a plate 46 that closes the rear side of the valve chest and which plate is secured in place by screws 47. To initiate the movement of the tappet and throw it over center, so to speak, so that the spring 46 may impel it to the limit of its movement in either direction, I employ a double ended trip 50 comprising a hub 51 and opposed arms 52. The hub 51 fits within a recess formed in the end of the piston shaft, and the arms 52 are accommodated by notches in the end of the shaft. A screw 56 passes through the hub 51 and is threaded into a tapped hole in the shaft and secures the trip in place.

The casing is shown as having lugs 55, perforated for the accommodation of screws or other fastening means, whereby the casing may be secured to the frame 57 of a windshield 58. A reduced extension 60 of the piston shaft 27 extends through an opening in the windshield frame and has suitably secured to its outer end an arm 61 which has connection at 62 with a wiper 63 which contacts with the outer surface of the windshield. An arm 64 is secured to the piston shaft between the casing and the inner surface of the windshield by means of which the shaft may be manually oscillated to move the wiper across the windshield when occasion arises.

The installation is completed by establishing communication between the intake manifold of the engine, or other suitable source of suction, and the motor, through a suitable conduit which has one of its ends connected to the nipple 23. With the valve parts in the condition shown in the drawing, the right hand end of the casing is exhausted through the passageway 13, groove 16 of the valve body, passageway 17, and so on. This causes the piston 30 to move to the right, air being supplied in the meanwhile to the opposite end of the casing through openings 66 that lead into the valve chest, port 14 of the valve body, and passageway 12. The movement of the piston continues until the trip 50, which is fixed to the rear end of the piston shaft, engages through the appropriate one of its arms 52, the arm 43 of the tappet, and swings said tappet over center so that the spring 42 may throw it to its other extreme position and cause it to engage the lug 41 of the valve body and rock the valve body to the other limit of its movement to instantly place the groove 16 of the valve body into communication with the passageway 12 and the port 15 into communication with the passageway 13, thus reversing the conditions above described and causing the piston to be moved to the left.

From this disclosure it will be seen that my invention provides a very simple and cheap, yet highly efficient and durable packing for pistons of motors of the class described, and one which is particularly convenient of manufacture and installation and which requires only ordinary skill and care in incorporating it in the motor.

Having thus described my invention, what I claim is:

1. In a motor of the character set forth comprising a casing, a shaft supported transversely of the casing adjacent a wall thereof, a piston extending from the shaft and dividing the casing into two compartments, valve mechanism through which, in alternation, one of the compartments is placed in communication with a source of motive fluid and the other compartment is exhausted, and packing material carried by and extending about the shaft from one side of the piston to the other and between the shaft and the aforesaid wall to effectively close the joint between the shaft and wall.

2. In a motor of the character set forth, the combination of a casing, a shaft extending substantially parallel to and situated adjacent one wall of the casing and having its ends journaled in opposed walls thereof, and a piston extending from the shaft and dividing the casing into two compartments, valve mechanism through which, in alternation, one of said compartments is placed in communication with a source of motive fluid and the other is permitted to be exhausted, and packing material carried by and extending about the shaft from one side of the piston to the other, said material, throughout the length of the shaft, engaging the first mentioned wall of the casing and adjacent the ends of the shaft, the said opposed walls of the casing.

3. In a motor of the character set forth, the combination of a casing, a shaft extending substantially parallel to and situated adjacent one wall of the casing and having its ends journaled in opposed walls thereof, and a piston extending from the shaft and dividing the casing into two compartments, valve mechanism through which, in alternation, one of said compartments is placed in communication with a source of motive fluid and the other is permitted to be exhausted, and a sheet of packing material having its central portion wrapped about the shaft and its end portions disposed on opposite sides of the piston, and spreaders applied to the opposite sides of the piston and between which spreaders and the piston said end portions of the sheet of packing material are clamped, the central portion of the sheet where it is wrapped about the said shaft engaging throughout its width the first mentioned wall of the casing, while the entire edge portion of the sheet engages the walls of the casing adjacent the ends of the shaft and about the periphery of the piston to effectively close the joint between the piston and the casing walls, thereby to prevent communication between the compartments.

4. A packing element for pistons of rotary motors of the type wherein a blade piston extends from the motor shaft and divides the motor casing into two compartments, said packing, consisting of a single piece of packing material disposed about the motor shaft and on opposite sides of the piston.

5. A packing element for pistons of rotary motors of the type wherein a blade piston extends from the motor shaft and divides the motor casing into two compartments, said packing consisting of a single piece of packing material disposed about the motor shaft and alongside the piston so as to contact about the edge of the piston and along the shaft with the walls of the motor casing thereby to constitute a packing for both the piston and shaft.

6. A packing element for the shafts of rotary motors of the type wherein a blade piston extends from the motor shaft and divides the motor casing into two compartments, said packing consisting of a piece of packing material disposed about the shaft and movable therewith and arranged for wiping engagement with an adjacent wall of the motor casing.

In testimony whereof, I hereunto affix my signature.

SAMUEL LIPPERT.